(12) United States Patent
Laredo et al.

(10) Patent No.: US 11,074,158 B2
(45) Date of Patent: *Jul. 27, 2021

(54) GRAY-BOX TESTING BASED ON CONCRETE USAGES

(71) Applicant: International Business Machines Corporation, Armonk, NY (US)

(72) Inventors: Jim A. Laredo, Katonah, NY (US); Aleksander Slominski, Riverdale, NY (US); John E. Wittern, New York, NY (US); Annie T. Ying, Vancouver (CA); Christopher C. Young, Kitchener (CA); Yunhui Zheng, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 174 days.

This patent is subject to a terminal disclaimer.

(21) Appl. No.: 15/828,480

(22) Filed: Dec. 1, 2017

(65) Prior Publication Data

US 2019/0171551 A1 Jun. 6, 2019

(51) Int. Cl.
*G06F 9/44* (2018.01)
*G06F 11/36* (2006.01)
*G06F 11/34* (2006.01)
*G06F 8/41* (2018.01)

(52) U.S. Cl.
CPC ...... *G06F 11/3684* (2013.01); *G06F 11/3414* (2013.01); *G06F 11/3688* (2013.01); *G06F 8/433* (2013.01)

(58) Field of Classification Search
CPC .................................................. G06F 9/44
See application file for complete search history.

(56) References Cited

U.S. PATENT DOCUMENTS

| | | | |
|---|---|---|---|
| 8,161,459 B2 | 4/2012 | Gorthi et al. | |
| 9,064,055 B2 * | 6/2015 | Hu | G06F 8/60 |
| 2003/0212661 A1 * | 11/2003 | Avvari | G06F 11/3676 |
| 2009/0183143 A1 | 7/2009 | Li et al. | |

(Continued)

OTHER PUBLICATIONS

Dietz, Noah, "Fulfilling a RESTful Commitment: Test-Suite Generation for Swagger-based REST APIs", Dietz Master Thesis, Jun. 2016, © 2008-2017, researchgate.net , 2 pages.

(Continued)

*Primary Examiner* — Jae U Jeon
(74) *Attorney, Agent, or Firm* — Stephen R. Yoder (57) ABSTRACT

A computer implemented method for testing an application according to usage data includes receiving an application to be tested and a set of usage data corresponding to the application to be tested, wherein the set of usage data corresponds to previously executed code sequences, identifying one or more code sequences of interest corresponding to the received application, wherein the code sequences of interest correspond to codes sequences that are configured to exercise the received application, extracting concrete usages of the code sequence of interest from the received set of usage data, generating one or more test cases for the application according to the extracted usages, and providing the one or more generated test cases. The method may additionally include testing the application according to the one or more generated test cases.

20 Claims, 4 Drawing Sheets

(56) References Cited

U.S. PATENT DOCUMENTS

| | | | |
|---|---|---|---|
| 2013/0219374 A1* | 8/2013 | Jain | G06F 8/30 |
| | | | 717/131 |
| 2013/0275953 A1* | 10/2013 | Zheng | G06F 11/3676 |
| | | | 717/131 |
| 2014/0096111 A1* | 4/2014 | Mahler | G06F 11/3688 |
| | | | 717/124 |
| 2017/0083430 A1* | 3/2017 | Meerovich | G06F 8/00 |
| 2017/0132121 A1* | 5/2017 | Cooper | G06F 11/3676 |

OTHER PUBLICATIONS

Fertig, et al., "Model-driven Testing of RESTful APIs", WWW 2015 Companion, May 18-22, 2015, Florence, Italy. ACM 978-1-4503-3473-0/15/05, http://dx.doi.org/10.1145/2740908.2743045, 6 pages.

Ji et al., "Test Case Selection for Data Flow Based Regression Testing of BPEL Composite Services", 2016 IEEE International Conference on Services Computing, 978-1-5090-2628-9/16, © 2016 IEEE, DOI 10.1109/SCC.2016.77, 8 pages.

Kicillof et al., "Achieving Both Model and Code Coverage with Automated Gray-Box Testing", AMOST'07, Jul. 9-12, 2007, London, UK, Copyright 2007 ACM 978-1-59593-850-3/07/0007, 11 pages.

Kulkarni et al., "Generating and Analyzing Test cases from Software Requirements using NLP and Hadoop", International Journal of Current Engineering and Technology, vol. 4, No. 6 (Dec. 2014), 4 pages.

Linzhang et al., "Generating Test Cases from UML Activity Diagram based on Gray-Box Method", Proceedings of the 11th Asia-Pacific Software Engineering Conference (APSEC'04), 1530-1362/04, IEEE, 8 pages.

Singh et al., "Automated Generation of Functional Test Cases and Use Case Diagram using SRS Analysis", International Journal of Computer Applications (0975-8887), vol. 124—No. 5, Aug. 2015, 5 pages.

* cited by examiner

```
1.  var token = 'YYY';
2.  var usuario= "XXX";
3.
4.  var instagram = function() {
5.    return {
6.      init: function() {
7.        $.ajax({
8.          type: "GET",
9.          url: 'http://api.instagram.com/v1/users/search?q='+
10.            usuario + '&access_token='+ token + ' ',
11.          successs: function(data)   [
12.            instagram.loadImages(data.data[0].id);
13.         }
14.       });
15.     },
16.     loadImages: function(userID) {
17.       $.ajax({
18.         type: "GET",
19.         dataType: "jsonp",
20.         cache: false,
21.         url: 'http://api.instagram.com/v1/users/'+ userID +
22.           '/media/recent/?access_token=/+ token _'',
23.         success: function(data) {
24.           // ...
25.         }
26.       });
27.     }
28.   }
29. }();
```

310

{
  "request": {
    "type": "GET",
    "url": "http://api.instagram.com/v1/users/search?q=XXX&access_token=YYY"
  }
}

GRAY-BOX TESTING BASED ON CONCRETE USAGES

BACKGROUND OF THE INVENTION

The present invention relates generally to the field of debugging, and more specifically to implementing gray box testing based on usage data.

Debugging refers to the process or series of processes by which defects, flaws, and other problems within a program that are causing an instance of computer software or a system to function incorrectly. Debugging can take on many forms, but are often categorized according to the amount of information available to the debugger, which can be an individual seeking to manually debug the software or system or additional hardware/software configured to identify potential deficiencies in a program. White box testing (also called clear box testing, glass box testing, transparent box testing, structural testing, etc.) refers to scenarios in which the internal particulars of an application being debugged are known to the debugger, and therefore the internal structures and workings of the application as opposed to the functionality. Black-box testing refers to scenarios in which the functionality of an application is tested and analyzed without accessing the applications internal structures. Therefore, in scenarios where little to no information regarding the application and its mechanisms, black-box testing is often a more feasible approach to testing.

Gray box testing (or gray box analysis), as its name may imply, falls in the area between white box testing and black box testing. In other words, gray box testing refers to scenario in which the debugger or tester has limited (not all) information about the application. A gray box refers to a device, program, or system whose internal structures and workings are only partially understood. Gray box testing covers a wide range of scenarios, from having very little information about an application to having nearly (but not) all of said information.

SUMMARY

As disclosed herein, a computer implemented method for testing an application according to usage data includes receiving an application to be tested and a set of usage data corresponding to the application to be tested, wherein the set of usage data corresponds to previously executed code sequences, identifying one or more code sequences of interest corresponding to the received application, wherein the code sequences of interest correspond to codes sequences that are configured to exercise the received application, extracting concrete usages of the code sequence of interest from the received set of usage data, generating one or more test cases for the application according to the extracted usages, and providing the one or more generated test cases. The method may additionally include testing the application according to the one or more generated test cases. A computer program product and a computer system corresponding to the method are also disclosed.

DETAILED DESCRIPTION

Traditional gray-box testing requires models or specifications for the application being tested, and the efforts required to obtain such domain specific knowledge are considerable. Additionally, the quality of a gray-box testing implementation is dependent on the consistencies between models and the application's code. The methods disclosed herein enable gray-box testing without source code, models, specifications, or human expertise, by instead leveraging concrete implementations that use an application to provide the necessary information.

The present invention will now be described in detail with reference to the Figures. Implementation of embodiments of the invention may take a variety of forms, and exemplary implementation details are discussed subsequently with reference to the Figures.

Figure 1:
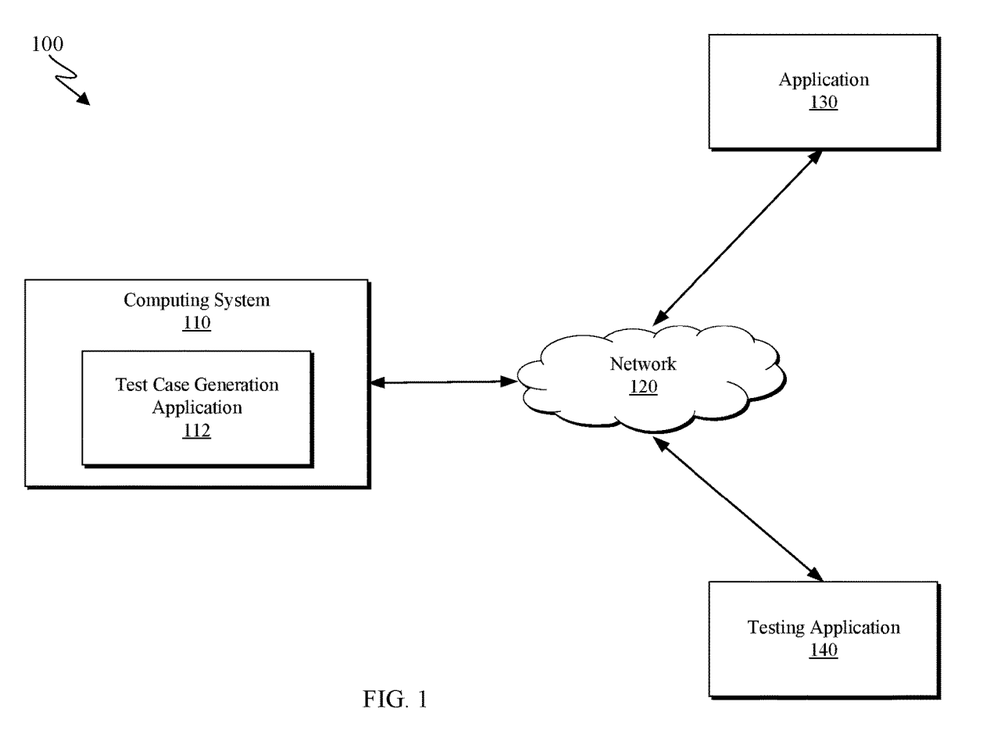
FIG. 1 is a block diagram depicting an application testing system in accordance with at least one embodiment of the present invention.

FIG. 1 is a block diagram depicting an application testing system 100 in accordance with at least one embodiment of the present invention. As depicted, application testing system 100 includes computing system 110, network 120, application 130, and testing application 140. Application testing system 100 enables improved gray-box testing for an application without access to the application's source code.

Computing system 110 can be a desktop computer, laptop computer, specialized computer server, or any other computer system known in the art. In some embodiments, computing system 110 represents a computer system utilizing clustered computers and components to act as a single pool of seamless resources. In general, computing system 110 is representative of any electronic device, or combinations of electronic devices, capable of executing machine-readable program instructions, as described in greater detail with regard to FIG. 4.

As depicted, computing system 110 includes test case generation application 112. Test case generation application 112 may be configured to analyze concrete usage cases of an application (such as application 130) to enable improved gray-box testing for the application. Test case generation application 112 may additionally be configured to execute a test case generation method to provide one or more test cases based on the analyzed concrete usage cases. One embodiment of a suitable test case generation method is discussed with respect to FIG. 2 below. In at least one embodiment, test case generation application 112 is configured to receive usage data from application 130 via network 120.

Network 120 can be, for example, a local area network (LAN), a wide area network (WAN) such as the Internet, or a combination of the two, and include wired, wireless, or fiber optic connections. In general, network 120 can be any combination of connections and protocols that will support communications between computing system 110, application 130, and testing application 140 in accordance with an embodiment of the present invention.

Application 130 may correspond to any program or application to be tested using the methods disclosed herein. In at least one embodiment, application 130 sends usage data to computing system 110 via network 120. Said usage data may include concrete usage cases which include invocations or requests, such as request strings for web APIs or function calls for remote procedure calls, etc. Application 130 may additionally be accessible to testing application 140, such that testing application 140 may configure application 130 to facilitate gray-box testing.

Testing application 140 may be any application capable of testing and/or debugging applications such as application 130. In at least some embodiments, testing application 140 receives test cases from test case generation application 112 via network 120, and proceeds to test application 130 according to the generated test cases. While in the depicted embodiment test application 140 is a separate entity from computing system 110 and test case generation application 112, it should be appreciated that in other embodiments test case generation and consequential testing may be carried out by a single application hosted on a single computing system.

Figure 2:
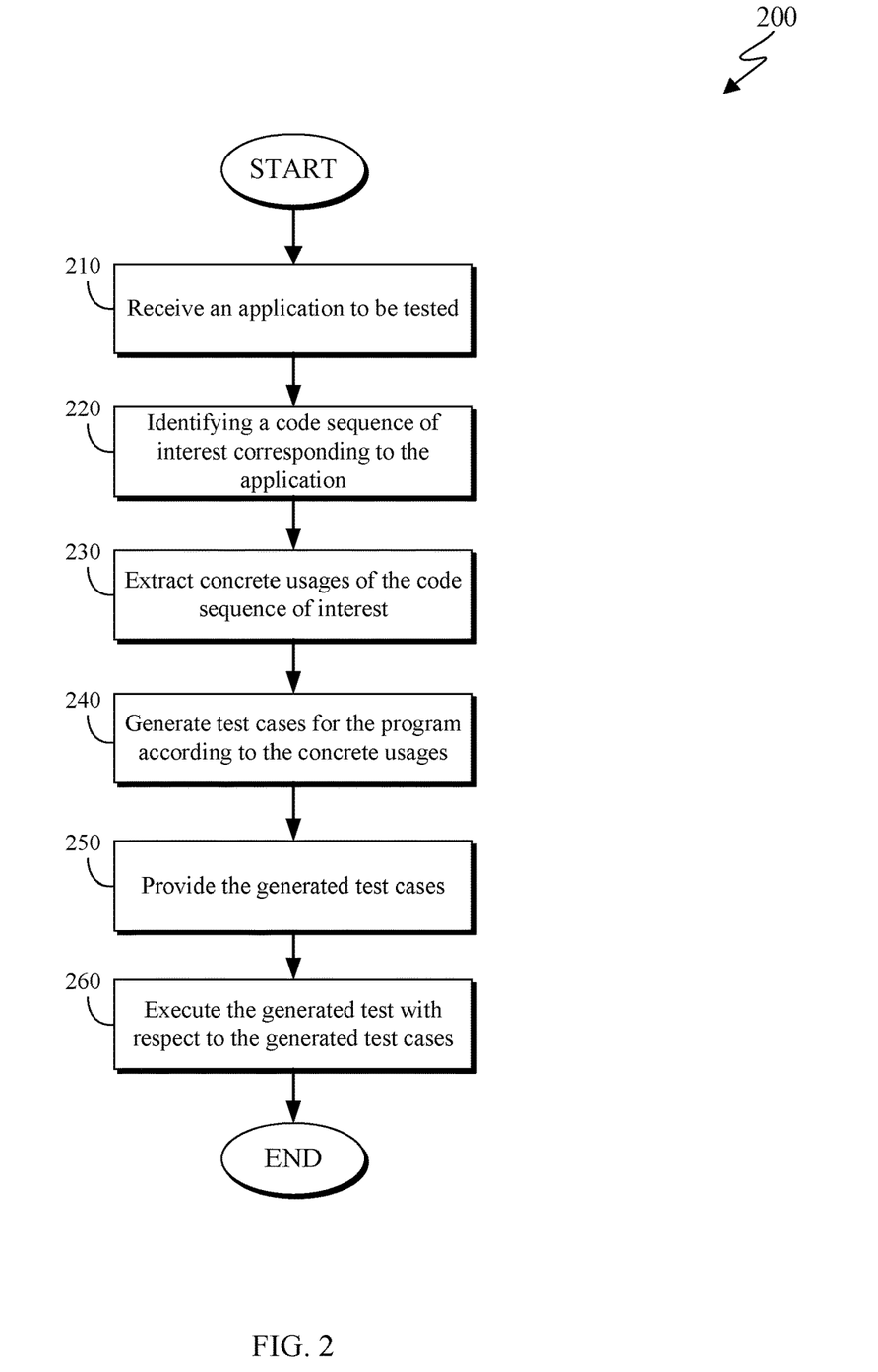
FIG. 2 depicts a test case generation method in accordance with at least one embodiment of the present invention.

FIG. 2 depicts a test case generation method 200 in accordance with at least one embodiment of the present invention. As depicted, test case generation method 200 includes receiving (210) an application to be tested, identifying (220) a code sequence of interest corresponding to the application, extracting (230) concrete usages of the code sequence of interest, generating (240) one or more test cases for the application according to the extracted usages, providing (250) the generated test cases, and executing (260) the generated tests to test the application with respect to the generated test cases. Test case generation method 200 enables contextual application testing with respect to how the application is actually implemented via real world usage cases.

Receiving (210) an application to be tested may include receiving, via a user input or a test management application, an application marked for testing. In some embodiments, receiving (210) an application to be tested additionally includes receiving application details corresponding to the received application. Application details may correspond to one or more code sequences from the application that are to be tested. In some embodiments, receiving (210) an application to be tested also includes receiving usage data corresponding to the received application. As used herein, usage data may refer to a set of one or more invocations or requests that may correspond to the application to be tested. For example, if the application to be tested corresponds to an image editing application, then the usage data may refer to a set of one or more invocations or requests related to image manipulation within a system being analyzed. Receiving (210) an application to be tested may also include receiving one or more web API's and one or more code libraries as well.

Identifying (220) one or more code sequences of interest corresponding to the application may include analyzing received usage data to identify a code sequence executed in accordance with the received application. Identifying (220) a code sequence of interest may include determining one or more operations executed by the received application. Determining said operations may include identifying one or more functions of the application, and determining a set of operations that may be executed to accomplish said functions. Identifying (220) one or more code sequences of interest may additionally include identifying code that exercises the received application. The test generation module may then execute a search for one or more code sequences corresponding to the one or more functions executed by the received application. In at least one embodiment, identifying (220 one or more code sequences of interest includes extracting code usages from third parties that may have used the application in large code repositories or other static sources.

Figure 3:
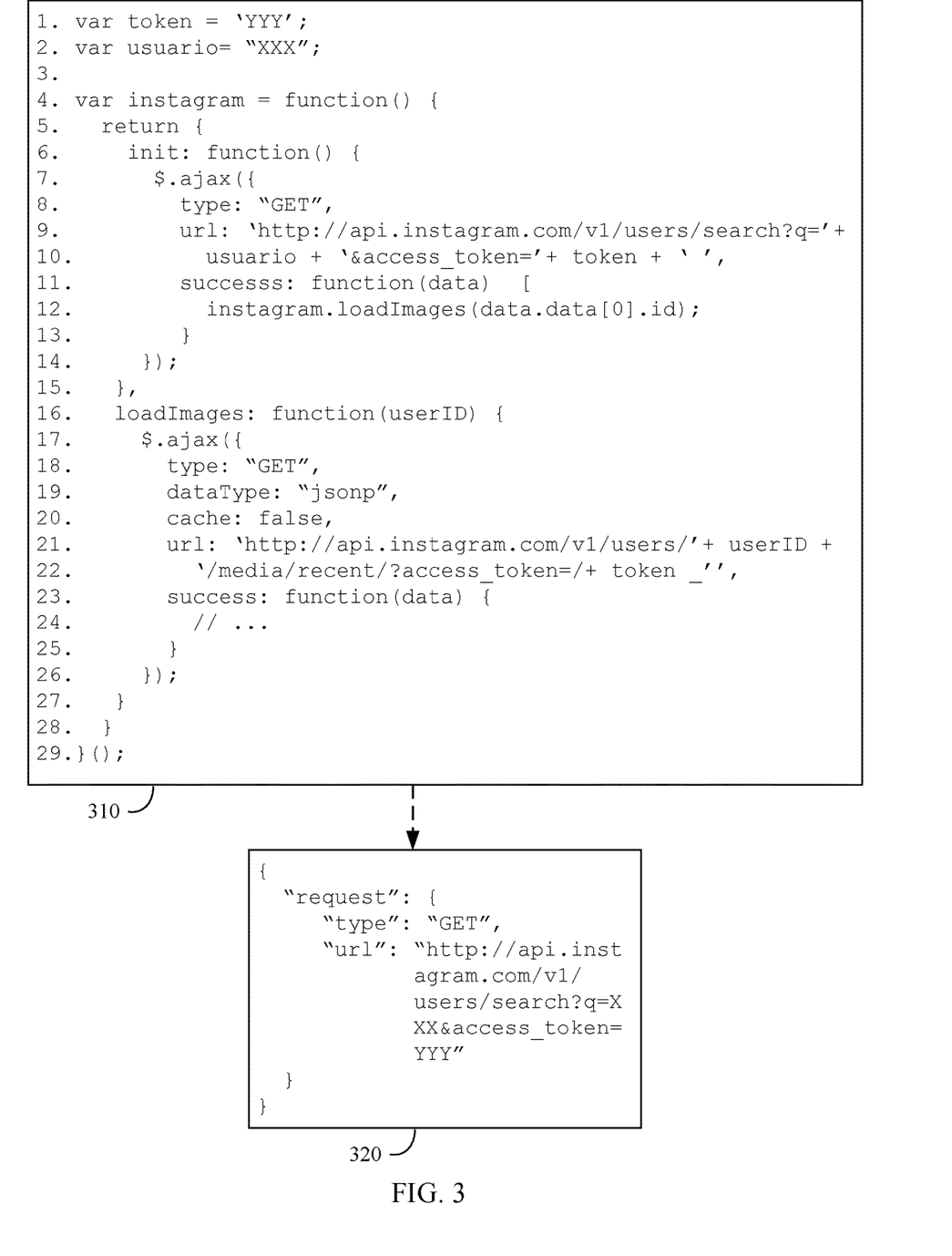
FIG. 3 depicts an example concrete usage case extracted from a code in accordance with one embodiment of the present invention.

Extracting (230) concrete usages of the code sequence(s) of interest may include using big code analysis to identify one or more concrete implementations of the identified code sequence(s) of interest. Big code analysis as used herein refers to the analysis of large code repositories. In at least one embodiment, extracting (230) concrete usages of the code sequence(s) of interest includes searching for invocations or requests, such as request strings for web APIs or function calls for remote procedure calls, etc. Extracting (230) concrete usages of the code sequence(s) of interest from large code repositories may additionally include determining a set of one or more parameter values associated with the concrete usages. For example, in one embodiment the parameters could include an HTTP method, headers, parameters, and body for invoking the web API of an application. The extracted parameters may additionally include methods or end-points invoked, parameter names, concrete parameter assignments, or dependencies among method/API invocations. FIG. 3 depicts one example of parameter information extracted from a concrete usage of a code sequence.

Generating (240) one or more test cases for the application according to the extracted usages may include assigning one or more parameter values to be tested according to the extracted concrete usages. Generating (240) one or more test cases for the application may include creating test cases that include various parameter combinations, parameter value ranges, or dependencies among methods or endpoints. With respect to parameter combinations, generating (240) one or more test cases for the application may include determining, according to the extracted concrete usages, that a method or end point can have up to n parameters (for an integer n). In such a case, test cases are generated to test various combinations of the n parameters to determine if there is an application failure caused by one or more unique combinations.

With respect to parameter ranges, generating (240) one or more test cases for the application may include determining, according to the extracted concrete usages, the type of parameters associated with the code, as well as a range of possible values for the parameters based on the range of observed parameters. In such a case, test cases are generated to determine a range of acceptable variable values by testing values within the observed range as well as values extending out from the range. In some embodiments, test cases may be executed with respect to so-called "corner cases"; for example, with respect to variables with integer assignments, the corner cases may be −1, 0, and 1, as they each present a unique condition.

With respect to multiple dependencies, generating (240) one or more test cases for the application may include determining, according to the extracted concrete usages, whether there are methods or endpoints that are dependent on one another, and testing said dependencies. In such a case, test cases may be generated to generate new request sequences while preserving dependencies to ensure the application is able to maintain the required dependencies.

Providing (250) the generated test cases may include providing the generated one or more test cases to a client system or a testing application for execution. In some embodiments, the generated test cases may be provided in executable (testable) form; in other embodiments, providing (250) the generated test includes providing a summary or report of the generated test cases. The provided report or summary may include indications of the parameters or dependencies being tested in each test case.

Testing (260) the received application may include executing a test of the received application according to the generated test cases. In some embodiments, testing the received application is executed by the same application that generates the test cases; in other embodiments, the generated test cases are provided to a separate testing application where the received application is tested.

FIG. 3 depicts an example concrete usage case 320 extracted from a code 310 in accordance with one embodiment of the present invention. Usage case 320 is representative of an extracted concrete usage containing one or more functions of interest with respect to an application. Code 310 is analyzed by searching for invocations or requests, such as request strings for web APIs or function calls for remote procedure calls, etc. These invocations and requests are aggregated and provided as a concrete usage case 320, which can be analyzed to identify one or more parameters to be tested in a generated test case.

Figure 4:
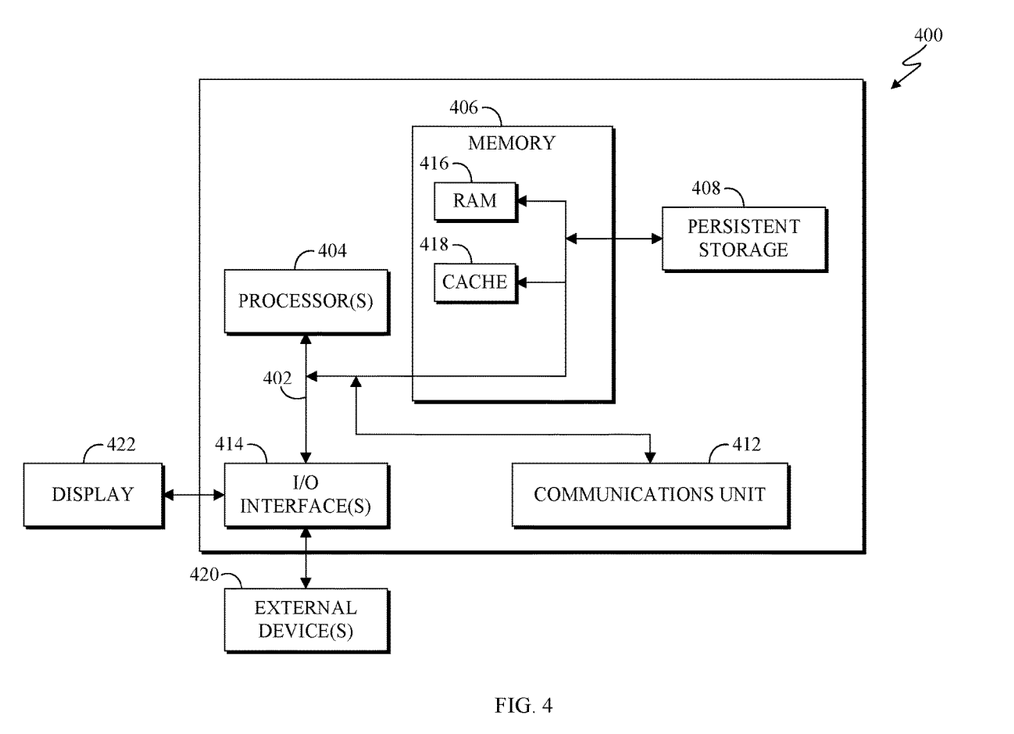
FIG. 4 depicts a block diagram of components of a computer, in accordance with some embodiments of the present invention.

FIG. 4 depicts a block diagram of components of computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for testing an application according to usage data, the method comprising:
   receiving an application to be tested and a set of usage data corresponding to the application to be tested, wherein the set of usage data is sourced from code repositories that make use of the received application;
   identifying one or more code sequences of interest corresponding to the received application, wherein the code sequences of interest correspond to codes sequences that are configured to exercise the received application;
   extracting concrete usages of the code sequence of interest from the received set of usage data, wherein the concrete usages correspond to actual usages of the one or more code sequences of interest;
   identifying one or more parameters corresponding to the extracted concrete usages of the code sequence of interest;
   generating one or more test cases for the application according to the extracted usages and the identified one or more parameters, wherein the one or more test cases test combinations of the identified parameters to determine if an application failure is caused by one or more unique combinations of parameters; and
   outputting the one or more generated test cases.

2. The computer implemented method of claim 1, further comprising identifying one or more dependencies corresponding to the extracted concrete usages of the code sequence of interest.

3. The computer implemented method of claim 2, wherein generating one or more test cases for the application according to the extracted usages includes generating test cases configured to test the application with respect to the identified one or more dependencies corresponding to the extracted concrete usages.

4. The computer implemented method of claim 1, wherein generating one or more test cases for the application according to the extracted usages includes generating test cases configured to test the application with respect to the identified one or more parameters corresponding to the extracted concrete usages.

5. The computer implemented method of claim 1, wherein identifying one or more code sequences of interest includes searching for invocations executed with respect to the received application.

6. The computer implemented method of claim 1, wherein providing the one or more generated test cases includes generating a report that indicates a set of parameters or dependencies being tested by each generated test case.

7. The computer implemented method of claim 1, further comprising executing the generated test according to the one or more generated test cases.

8. The method of claim 1, wherein the one or more test cases test parameter value ranges corresponding to the identified one or more parameters to determine if a unique range of parameters causes an application failure.

9. The method of claim 1, wherein the one or more test cases test dependencies among methods or endpoints according to the identified one or more parameters.

10. The method of claim 9, wherein generating one or more test cases further includes:
   determining that a method or end point can have up to "n" parameters; and
   generating test cases to test combinations of the n parameters to determine if there is an application failure caused by one or more unique combinations.

11. A computer program product for testing an application according to usage data, the computer program product comprising:
   one or more computer readable storage media and program instructions stored on the one or more computer readable storage media, the program instructions comprising instructions to:
   receive an application to be tested and a set of usage data corresponding to the application to be tested, wherein the set of usage data is sourced from code repositories that make use of the received application;
   identify one or more code sequences of interest corresponding to the received application, wherein the code sequences of interest correspond to codes sequences that are configured to exercise the received application;
   extract concrete usages of the code sequence of interest from the received set of usage data, wherein the concrete usages correspond to actual usages of the one or more code sequences of interest;
   identify one or more parameters corresponding to the extracted concrete usages of the code sequence of interest;
   generate one or more test cases for the application according to the extracted usages and the identified one or more parameters, wherein the one or more test cases test combinations of the identified parameters to determine if an application failure is caused by one or more unique combinations of parameters; and
   output the one or more generated test cases.

12. The computer program product of claim 11, further comprising instructions to identify one or more dependencies corresponding to the extracted concrete usages of the code sequence of interest.

13. The computer program product of claim 11, wherein generating one or more test cases for the application according to the extracted usages includes generating test cases configured to test the application with respect to the identified one or more parameters corresponding to the extracted concrete usages.

14. The computer program product of claim 11, wherein instructions to identify one or more code sequences of interest comprise instructions to search for invocations executed with respect to the received application.

15. The computer program product of claim 11, wherein instructions to provide the one or more generated test cases comprise instructions to generate a report that indicates a set of parameters or dependencies being tested by each generated test case.

16. A computer system for testing an application according to usage data, the computer program product comprising:
   one or more computer processors;
   one or more computer readable storage media;
   program instructions stored on the one or more computer readable storage media, the program instructions comprising instructions to:
   receive an application to be tested and a set of usage data corresponding to the application to be tested, wherein the set of usage data is sourced from code repositories that make use of the received application;
   identify one or more code sequences of interest corresponding to the received application, wherein the code sequences of interest correspond to codes sequences that are configured to exercise the received application;
   extract concrete usages of the code sequence of interest from the received set of usage data, wherein the concrete usages correspond to actual usages of the one or more code sequences of interest;
   identify one or more parameters corresponding to the extracted concrete usages of the code sequence of interest;
   generate one or more test cases for the application according to the extracted usages and the identified one or more parameters, wherein the one or more test cases test combinations of the identified parameters to determine if an application failure is caused by one or more unique combinations of parameters; and
   output the one or more generated test cases.

17. The computer system of claim 16, further comprising instructions to identify one or more dependencies corresponding to the extracted concrete usages of the code sequence of interest.

18. The computer system of claim 16, wherein generating one or more test cases for the application according to the extracted usages includes generating test cases configured to test the application with respect to the identified one or more parameters corresponding to the extracted concrete usages.

19. The computer system of claim 16, wherein instructions to identify one or more code sequences of interest comprise instructions to search for invocations executed with respect to the received application.

20. The computer system of claim 16, wherein instructions to provide the one or more generated test cases comprise instructions to generate a report that indicates a set of parameters or dependencies being tested by each generated test case.

* * * * *